United States Patent
Knudtzen et al.

(10) Patent No.: US 11,885,676 B2
(45) Date of Patent: Jan. 30, 2024

(54) OPTICAL COUPLING AND A MODULAR OPTICAL DEVICE COMPRISING THE SAME

(71) Applicant: Agilent Technologies, Inc., Santa Clara, CA (US)

(72) Inventors: Anders Knudtzen, Oakleigh East (AU); Steve Lever, Emerald (AU)

(73) Assignee: Agilent Technologies, Inc., Santa Clara, CA (US)

( * ) Notice: Subject to any disclaimer, the term of this patent is extended or adjusted under 35 U.S.C. 154(b) by 448 days.

(21) Appl. No.: 17/290,561

(22) PCT Filed: Oct. 15, 2019

(86) PCT No.: PCT/IB2019/058756
§ 371 (c)(1),
(2) Date: Apr. 30, 2021

(87) PCT Pub. No.: WO2020/089720
PCT Pub. Date: May 7, 2020

(65) Prior Publication Data
US 2021/0404873 A1 Dec. 30, 2021

(30) Foreign Application Priority Data
Oct. 31, 2018 (AU) .................................. 2018904134

(51) Int. Cl.
*G02B 7/00* (2021.01)
*G01J 3/02* (2006.01)
*G02B 7/20* (2021.01)

(52) U.S. Cl.
CPC ............ *G01J 3/0202* (2013.01); *G01J 3/0291* (2013.01); *G02B 7/003* (2013.01); *G02B 7/20* (2013.01)

(58) Field of Classification Search
None
See application file for complete search history.

(56) References Cited

U.S. PATENT DOCUMENTS

| 5,259,054 A | 11/1993 | Benzoni et al. |
| 2001/0051028 A1 | 12/2001 | Gutierrez et al. |

(Continued)

FOREIGN PATENT DOCUMENTS

| CN | 106895778 A | 6/2017 |
| CN | 106907989 A | 6/2017 |

(Continued)

OTHER PUBLICATIONS

International Search Report and Written Opinion dated Nov. 1, 2019, International Patent Application No. PCT/IB2019/058756, 8 pages.

*Primary Examiner* — Chad H Smith (57) ABSTRACT

The invention provides an optical coupling, comprising: a first coupling portion and a second coupling portion, the first and second coupling portions configured to mate in kinematic constraint via a first mounting interface and at least two further mounting interfaces, wherein: the first coupling portion comprises a first mounting element and the second coupling portion comprises a socket, and the first mounting element is receivable in the socket at the first mounting interface such that the first mounting interface constrains lateral displacements of the first coupling portion relative to the second coupling portion when mated; and at least one optical channel for transmitting abeam of light along an optical axis through the optical coupling, the optical channel comprising complementary light-transmitting ports in the first and second coupling portions, wherein the optical axis is not laterally removed from the first mounting interface by more than half the distance between the first mounting interface and the nearest of the further mounting interfaces.

20 Claims, 7 Drawing Sheets

(56) References Cited

U.S. PATENT DOCUMENTS

| | | |
|---|---|---|
| 2004/0047582 A1 | 3/2004 | Nasiri et al. |
| 2015/0102211 A1 | 4/2015 | Mathai et al. |
| 2017/0031110 A1* | 2/2017 | Bhagavatula ........ G02B 6/3863 |
| 2018/0156595 A1 | 6/2018 | Kay |

FOREIGN PATENT DOCUMENTS

| | | | |
|---|---|---|---|
| EP | 0550973 | B1 | 4/1999 |
| EP | 1070972 | B1 | 12/2004 |
| WO | 2018134722 | A1 | 7/2018 |

* cited by examiner

OPTICAL COUPLING AND A MODULAR OPTICAL DEVICE COMPRISING THE SAME

CROSS-REFERENCE TO RELATED APPLICATION

This application is a national stage entry pursuant to 35 U.S.C. § 371 of International Application No. PCT/IB2019/058756, filed on Oct. 15, 2019, which claims the benefit of Australian Patent Application No. 2018904134, filed Oct. 31, 2018, the contents of all of which are incorporated by reference in their entirety.

TECHNICAL FIELD

The invention relates to an optical coupling, and a modular optical device comprising an optical coupling. The optical coupling comprises first and second coupling portions configured to mate in kinematic constraint, and an optical channel for transmitting a beam of light along an optical axis through the optical coupling. The coupling portions mate via a first mounting interface and at least two further mounting interfaces, the first mounting interface provided by receipt of a first mounting element on the first coupling portion in a socket on the second coupling portion. In particular, the optical axis passes through the optical coupling at a position that is not laterally removed from the first mounting interface by more than half the distance between the first mounting interface and the nearest of the further mounting interfaces.

BACKGROUND OF INVENTION

In optical spectrometry, light is interacted with a sample and the transmission or reflection of the light, as a function of its wavelength, is measured to ascertain information about the sample characteristics, for example an analyte concentration. Optical spectrophotometers thus generally include a beam source, typically comprising a light source and one or more monochromators, and a beam target. In some spectrophotometer designs the beam target is the detector, with the beam passing through a sample compartment between the beam source and the detector. In other designs the beam target may be a beam splitter, with the resulting split beams interacted with multiple samples in parallel. In still other designs, at least the initial beam target is an optical element such as a mirror or lens.

In these and other designs, it is typically desirable that the beam is transmitted from the beam source to the beam target with a high degree of accuracy. Optical spectrophotometers are thus commonly constructed as an integrated unit, allowing the manufacturer to accurately align the optical components before delivery of the instrument to the customer, or during installation.

Modular optical spectrophotometers, where the beam source and a beam target are present in different modules, provide a number of advantages over integrated designs. Modular separation of the beam source from the sample compartment(s) and/or the detection system provides the opportunity to customise the device for a particular analysis. Thus, for example, one beam source module can be interchangeably coupled to multiple measurement modules configured for analysis of different sample types, or with different detector systems to make different sets of measurements. Alternatively, different beam source modules may be coupled to the same sample and detector module, depending on the beam requirements. Moreover, a modular design allows modules to be interchanged for maintenance, alignment or replacement, thus minimising downtime and reducing cost.

Modular optical devices generally incorporate an optical coupling, including a mechanical interface designed to allow reversible coupling of the modules. However, the interface assembly introduces an error into the relative locations of two modules when coupled, uncoupled and recoupled, which in turn results in an imprecision in the transmission of the beam onto the beam target. Mechanical interfaces must therefore be carefully designed and manufactured to minimise this error.

The issue is compounded when modules are to be interchanged, since a further error is introduced by the mechanical tolerances of interface components on each interchangeable module. Moreover, since interchangeable modules may not be produced or aligned on the same equipment, mechanical tolerances of the production or alignment jigs introduce yet a further inaccuracy. As a result, modular optical spectrophotometers are generally required to accommodate a larger error budget in the beam precision and accuracy than integrated designs.

While the foregoing discussion specifically relates to optical spectrophotometers, it will be appreciated that the principles apply to a wide range of other modular optical devices having beam sources and targets in separate modules and a mechanical interface to reversibly couple the modules.

There is therefore an ongoing need for optical couplings, and modular optical devices including such optical couplings, which at least partially address one or more of the above-mentioned short-comings or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect the invention provides an optical coupling, comprising: a first coupling portion and a second coupling portion, the first and second coupling portions configured to mate in kinematic constraint via a first mounting interface and at least two further mounting interfaces, wherein: the first coupling portion comprises a first mounting element and the second coupling portion comprises a socket, and the first mounting element is receivable in the socket at the first mounting interface such that the first mounting interface constrains lateral displacements of the first coupling portion relative to the second coupling portion when mated; and at least one optical channel for transmitting a beam of light along an optical axis through the optical coupling, the optical channel comprising complementary light-transmitting ports in the first and second coupling portions, wherein the optical axis is not laterally removed from the first mounting interface by more than half the distance between the first mounting interface and the nearest of the further mounting interfaces.

In some embodiments, the optical axis is not laterally removed from the first mounting interface by more than one third, or more than one quarter, or more than one eighth, of the distance between the first mounting interface and the nearest of the further mounting interfaces.

In some embodiments, the optical axis passes through the first mounting interface. The complementary light-transmitting ports may be apertures within the first mounting element and the socket. A substantially light-impervious seal may thus be provided around the optical channel when the first mounting element is received in the socket.

In some embodiments, the first mounting element comprises one or more convex mounting contact surfaces for contact with one or more socket contact surfaces when the first mounting element is received in the socket. The convex mounting contact surfaces may be spherical, and may have the form of a spherical segment. In some alternate embodiments, the socket comprises one or more convex socket contact surfaces for contact with one or more mounting element contact surfaces when the first mounting element is received in the socket.

In some embodiments, the socket is a conical socket, i.e. with circular cross-section. In some alternate embodiments, the socket is a trihedral socket.

The optical axis may be substantially aligned with the axis of rotation between the coupling portions, through the first mounting interface, expected when the lateral positions of the mounting interfaces are varied. In some embodiments, therefore, the optical axis is substantially aligned with the axis extending through centres of the first mounting element and the socket when mated.

In some embodiments, at least one of the complementary light-transmitting ports is an aperture having a maximum width of less than 30 mm, such as less than 20 mm, for example less than 10 mm.

In some embodiments, the further mounting interfaces consist of one vee mounting interface and one flat mounting interface. In some alternate embodiments, the further mounting interfaces consist of two half-vee mounting interfaces and one flat mounting interface.

In some embodiments, the first coupling portion comprises further mounting elements having convex contact surfaces for contact with the second coupling portion at each of the at least two further mounting interfaces.

In some embodiments, the optical coupling further comprises a clamping mechanism configured to releasably hold the first and second coupling portions together when mated.

In accordance with a second aspect, the invention provides a modular optical device comprising an optical coupling according to any one of the embodiments disclosed herein.

In some embodiments, the modular optical device comprises a first module comprising a beam source and a second module comprising a beam target, wherein the first module releasably couples to the second module via the optical coupling such that a beam of light is transmittable through the optical channel from the beam source to the beam target.

In some such embodiments, the modular optical device further comprises one or more third modules and/or one or more fourth modules, wherein: the third modules comprise a beam source, and the first and third modules interchangeably couple to the second module, and the fourth module comprises a beam target, and the second and fourth modules interchangeably couple to the first module. The beam may be transmittable onto the beam target with an accuracy of better than 50 microns when the first and third modules are interchanged and/or when the second and fourth modules are interchanged.

In some embodiments, the modular optical device is an optical spectrophotometer.

According to a third aspect, the invention provides a modular optical device comprising at least first and second modules, wherein: one of the first and second modules comprises a first coupling portion and the other of the first and second coupling portions comprises a second coupling portion, the first and second coupling portions configured to mate in kinematic constraint via a first mounting interface and at least two further mounting interfaces, wherein: the first coupling portion comprises a first mounting element and the second coupling portion comprises a socket, and the first mounting element is receivable in the socket at the first mounting interface such that the first mounting interface constrains lateral displacements of the first coupling portion relative to the second coupling portion when mated; and the first module comprises a beam source and the second module comprises a beam target, configured such that the beam source transmits a beam of light along an optical axis onto the beam target when the first and second coupling portions are mated, wherein the optical axis is not laterally removed from the first mounting interface by more than half the distance between the first mounting interface and the nearest of the further mounting interfaces.

In some embodiments, the optical axis is not laterally removed from the first mounting interface by more than one third, or more than one quarter, or more than one eighth, of the distance between the first mounting interface and the nearest of the further mounting interfaces.

In some embodiments, the optical axis passes through the first mounting interface. The beam may thus be transmitted through complementary apertures within the first mounting element and the socket. In some embodiments, a substantially light-impervious seal may thus be provided when the first mounting element is received in the socket.

The optical axis may be substantially aligned with the axis of rotation between the coupling portions, through the first mounting interface, expected when the lateral positions of the mounting interfaces are varied. In some embodiments, therefore, the optical axis is substantially aligned with the axis extending through centres of the first mounting element and the socket when mated.

In some embodiments, the modular optical device further comprises one or more third modules, wherein: the first and third modules interchangeably couple to the second module, and the third modules comprise a beam source configured such that the beam source transmits a beam of light along an optical axis onto the beam target of the second module when the second and third modules are coupled. The beam may thus be transmittable onto the beam target with an accuracy of better than 50 microns when the first and third modules are interchanged.

In some embodiments, the modular optical device further comprises one or more fourth modules, wherein: the second and fourth modules interchangeably couple to the first module, and the fourth module comprises a beam target configured such that the beam source of the first module transmits a beam of light along an optical axis onto the beam target when the first and fourth modules are coupled. The beam may thus be transmittable onto the beam target with an accuracy of better than 50 microns when the second and fourth modules are interchanged.

In some embodiments, the first mounting element comprises one or more convex mounting contact surfaces for contact with one or more socket contact surfaces when the first mounting element is received in the socket. The convex mounting contact surfaces may be spherical, and may have the form of a spherical segment. In some alternate embodiments, the socket comprises one or more convex socket contact surfaces for contact with one or more mounting element contact surfaces when the first mounting element is received in the socket.

In some embodiments, the socket is a conical socket; i.e. with circular cross-section. In some alternate embodiments, the socket is a trihedral socket.

In some embodiments, the further mounting interfaces consist of one vee mounting interface and one flat mounting interface. In some alternate embodiments, the further mounting interfaces consist of two half-vee mounting interfaces and one flat mounting interface.

In some embodiments, the first coupling portion comprises further mounting elements having convex contact surfaces for contact with the second coupling portion at each of the at least two further mounting interfaces.

In some embodiments, the modular optical device further comprises a clamping mechanism configured to releasably hold the first and second coupling portions together when mated.

In some embodiments, the modular optical device is an optical spectrophotometer.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

The present invention relates to an optical coupling which may be used to couple modules of a modular optical device. The optical coupling includes a first coupling portion and a second coupling portion, which are configured to mate in kinematic constraint via a first mounting interface and at least two further mounting interfaces. The first coupling portion comprises a first mounting element and the second coupling portion comprises a socket configured to receive the first mounting element, the receipt of the first mounting element in the socket providing the first mounting interface. The first mounting interface constrains all three translational degrees of freedom, and thus all relative lateral displacements, of the coupling portions when mated, according to the principles of kinematic constraint.

The optical coupling includes an optical channel through which a beam of light may be transmitted along an optical axis. The optical channel comprises complementary light-transmitting ports in the first and second coupling portions, of at least sufficient dimensions to transmit the beam. The optical axis passes through the first and second portions close to, and preferably directly through, the first mounting interface. In particular, the optical axis is not laterally removed from the first mounting interface by more than half the distance between the first mounting interface and the nearest of the further mounting interfaces. The inventors have discovered that this arrangement results in an advantageously high degree of accuracy when transmitting a beam between modules coupled by the optical coupling.

As used herein, a lateral displacement of one coupling portion relative to the other is a displacement in a direction orthogonal to the axis extending through the centres of the first mounting element and the socket when mated. As used herein, lateral removal of the optical axis from the first mounting interface refers to the distance removed from the centre of the first mounting interface in a direction orthogonal to the axis extending through the centres of the first mounting element and the socket.

As used herein, a light-transmitting port refers to any area of a coupling portion sufficiently transmissive of light and having sufficient dimensions that a beam of light may be transmitted through the port, and includes physical openings, such as enclosed apertures, and solid windows of a suitably transparent material.

The principles of kinematic constraint may be used to constrain a body, or more accurately the relative motion or position of two bodies, with great accuracy. A body has six degrees of freedom, being the three translations along x, y and z axes and the three rotations about these axes. Thus, six contact points between two bodies, each configured to constrain one of the degrees of freedom, allows the bodies to be precisely and reproducibly positioned relative to each other when held in contact. It will be appreciated that kinematic constraint represents a mathematical ideal, and practical devices said to be in kinematic constraint always deviate from this ideal. For example, manufacturing limitations and deformation under pressure prevent an idealized single-point contact between bodies.

A number of interface configurations have been disclosed for holding two bodies together in kinematic constraint. The Boyes clamp is one such configuration suitable to provide a kinematic interface between planar sides of two bodies. In a typical Boyes configuration, one of the bodies is equipped with three mounting elements having spherical contact surfaces (generally ball mounts). The other body is equipped with three V-shaped channels (hereafter "vees") which have two opposing angled planar surfaces. Each vee is configured to receive one ball mount with contact points on each of the opposing surfaces, thus providing one mounting interface. Each vee thus constrains two degrees of freedom, so that full kinematic constraint is provided by the three mounting interfaces when the two bodies are held together with a pretensioning force.

A Boyes clamp layout might thus be used to provide the mechanical interface of an optical coupling between modules of an optical device. However, the inventors have recognised that variability in the positions of the interface components, for example as a result of mechanical tolerances when constructing interchangeable modules, results in lateral displacements of each point on the interface surfaces. This will cause inaccuracies in transmitting the beam from one module to the beam target in the second module when one of the modules is interchanged.

Figure 1:
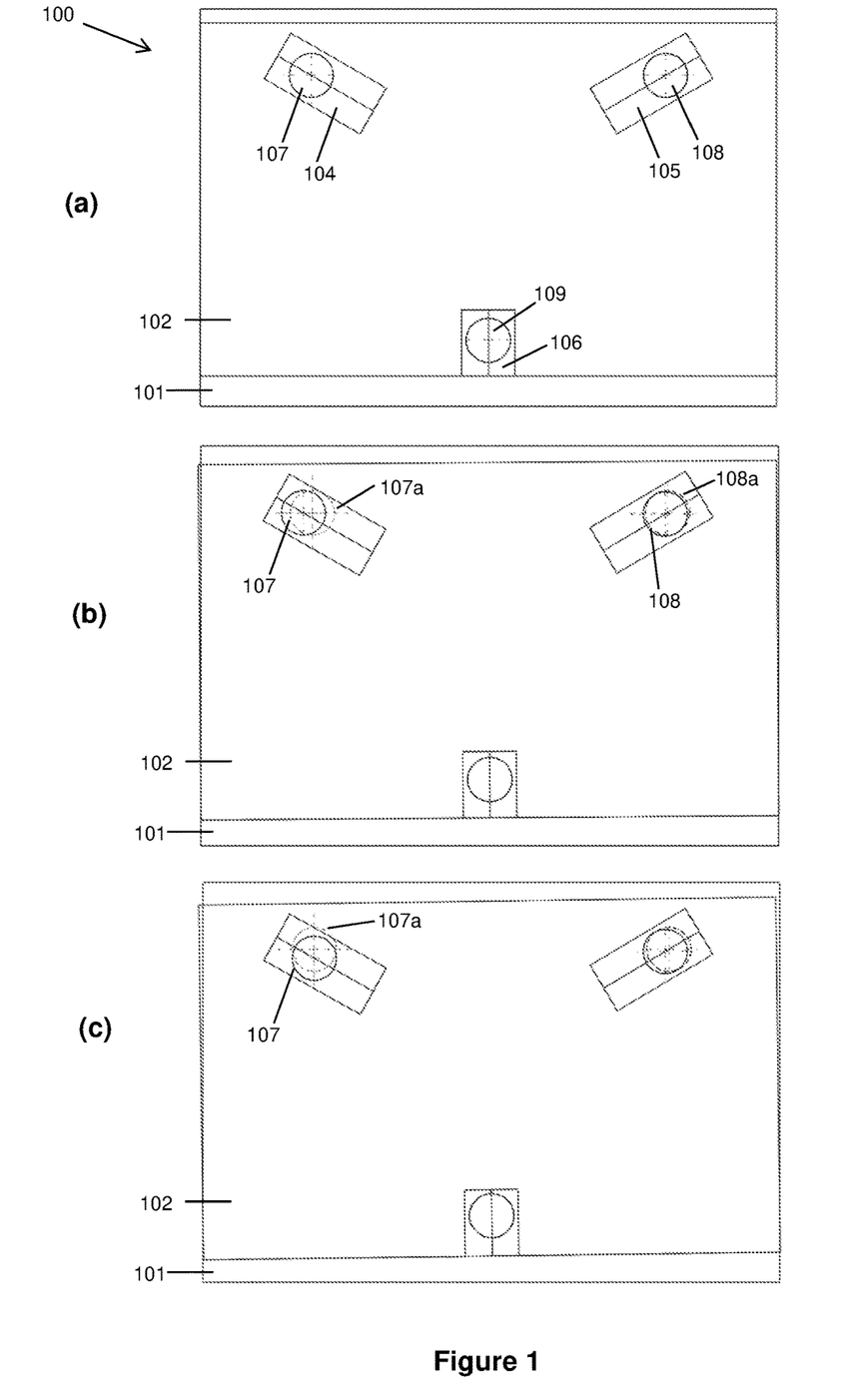
FIG. 1 schematically depicts in plan view a Boyes kinematic clamp arrangement, showing the effect of variation in the lateral position of one mounting element on the relative positions of the two coupling portions when mated.

This may be better appreciated with reference to FIG. 1, which depicts in FIG. 1a Boyes kinematic interface 100 between body portions 101 and 102, including spherical mounting elements 107, 108 and 109 on body portion 101 and vees 104, 105 and 106 on overlaid body portion 102 (shown superimposed in the figure). Spherical mounting elements 107, 108 and 109 are received in vees 104, 105 and 106 respectively, thus placing body portions 101 and 102 in kinematic constraint.

In FIG. 1b, mounting element 107 is shifted to the left on body portion 101, representative of a case where modules including body portions 101 are interchanged, and the positions of the interface components on each module have the expected mechanical tolerances. The previous position of mounting element 107, as seen in FIG. 1a, is shown with dashed line 107a. Body portions 101 and 102 are again in kinematic constraint, with mounting elements 107, 108 and 109 received in vees 104, 105 and 106 respectively. The shifting of mounting element 107 causes a lateral displacement of each position on body portion 102 relative to body portion 101, as indicated for example in the position of mounting element 108 relative to its previous position shown with dotted line 108a. Similarly, a vertical shift of mounting element 107 relative to its previous position shown with dashed line 107a, as seen in FIG. 1c, also causes a lateral displacement of each position on body portion 102 relative to body portion 101.

The Kelvin clamp is another configuration suitable to provide a kinematic interface between two bodies. In a typical Kelvin configuration, one of the bodies is again equipped with three mounting elements having spherical contact surfaces (generally ball mounts). The other body is equipped with one socket, one vee (with the groove oriented towards the socket) and one flat surface. When the bodies are mated, the ball mounts are received in the socket and vee and abut against the flat respectively, thus providing three mounting interfaces. The socket is configured to constrain three degrees of freedom when the bodies are held together, i.e. all three translations including both normal lateral displacements of the bodies relative to each other. The vee and the flat respectively constrain two rotational degrees of freedom and one rotational degree of freedom, thus fully constraining the two bodies.

Ideally, the socket is a trihedral socket, having three angled planar surfaces arranged symmetrically around the socket to provide three contact points when the ball mount is received in the socket. In practice, however, a conical socket may be used, providing a circular contact line between the socket and the ball mount. This arrangement provides a satisfactory approximation of the kinematic constraint of an ideal trihedral socket.

The inventors have recognised that relative lateral displacements of the interface surfaces, caused by variability in the position of interface components in a Kelvin clamp arrangement, are smaller for points closer to the socket mounting interface. At the centre of the socket itself, the lateral displacement is substantially zero, with only a relative rotation of the interface surfaces. Thus, the effect of mechanical tolerances in the interface components of interchangeable modules of an optical device is minimised if the optical axis is positioned close to, and preferably directly through, the socket mounting interface. A beam from the beam source in one module may thus be transmitted to the beam target in the second module with high precision, and accuracy when interchanging modules.

Figure 2:
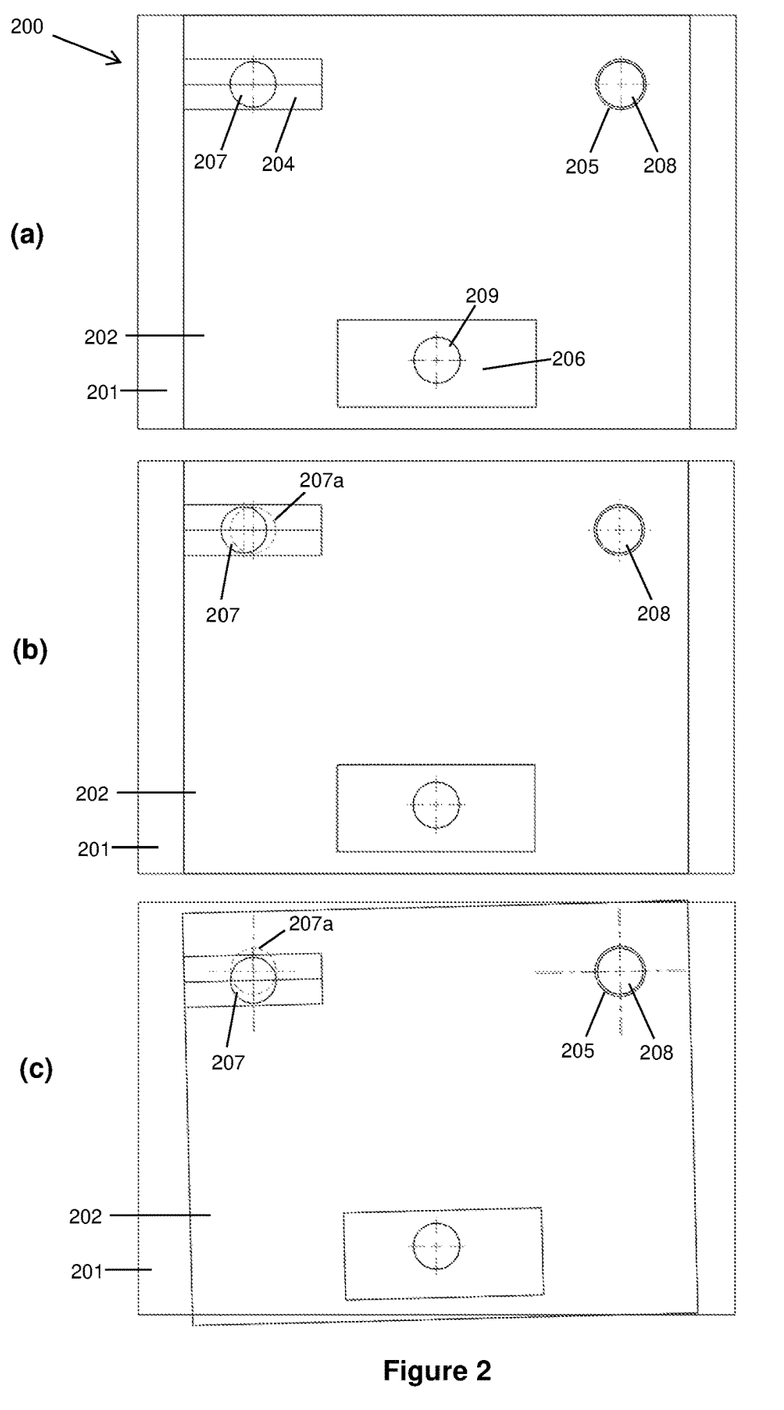
FIG. 2 schematically depicts in plan view a Kelvin kinematic clamp arrangement, showing the effect of variation in the lateral position of one mounting element on the relative positions of the two coupling portions when mated.

This may be better appreciated with reference to FIG. 2, which depicts in FIG. 2a Kelvin kinematic interface 200 between body portions 201 and 202, including spherical mounting elements 207, 208 and 209 on body portion 201 and socket 205, vee 204 and flat 206 on overlaid body portion 202 (shown superimposed in the figure). Spherical mounting elements 208, 207 and 209 are received in socket 205, vee 204 and flat 206 respectively, thus placing body portions 201 and 202 in kinematic constraint.

In FIG. 2b, mounting element 207 is shifted to the left on body portion 201, representative of a case where modules including body portions 201 are interchanged and the positions of the interface components on each module have the expected mechanical tolerances. The previous position of mounting element 207, as seen in FIG. 2a, is shown with dashed line 207a. Body portions 201 and 202 remain in kinematic constraint, with mounting elements 208, 207 and 209 received in socket 205, vee 204 and flat 206 respectively. The sideways shifting of mounting element 207 in this case causes no movements of body portions 201 and 202 relative to each other, since the mounting element has only moved along the axis of the vee in which it is received.

In FIG. 2c, mounting element 207 is shifted vertically on body portion 201, as indicated by comparison to its previous position shown with dashed line 207a. Body portions 201 and 202 are again in kinematic constraint, with mounting elements 208, 207 and 209 received in socket 205, vee 204 and flat 206 respectively. The vertical shifting of mounting element 207 causes a rotation of body portion 202 relative to body portion 201, with the axis of rotation at the mounting interface provided by socket 205 and mounting element 208. Thus, positions on the bodies which are closer to this mounting interface are laterally displaced by smaller amounts than positions further away from the axis of rotation. Mounting element 208 and socket 205 are not laterally displaced at all relative to each other but are only subject to the rotation.

It will also be appreciated that variation in the lateral position of mounting element 209 has no effect on the relative positions of body portions 201 and 202, since it is constrained only by flat 206. Moreover, variation in the lateral position of mounting element 208 again produces only a relative rotation of body portions 201 and 202 about the socket mounting interface.

Figure 3:
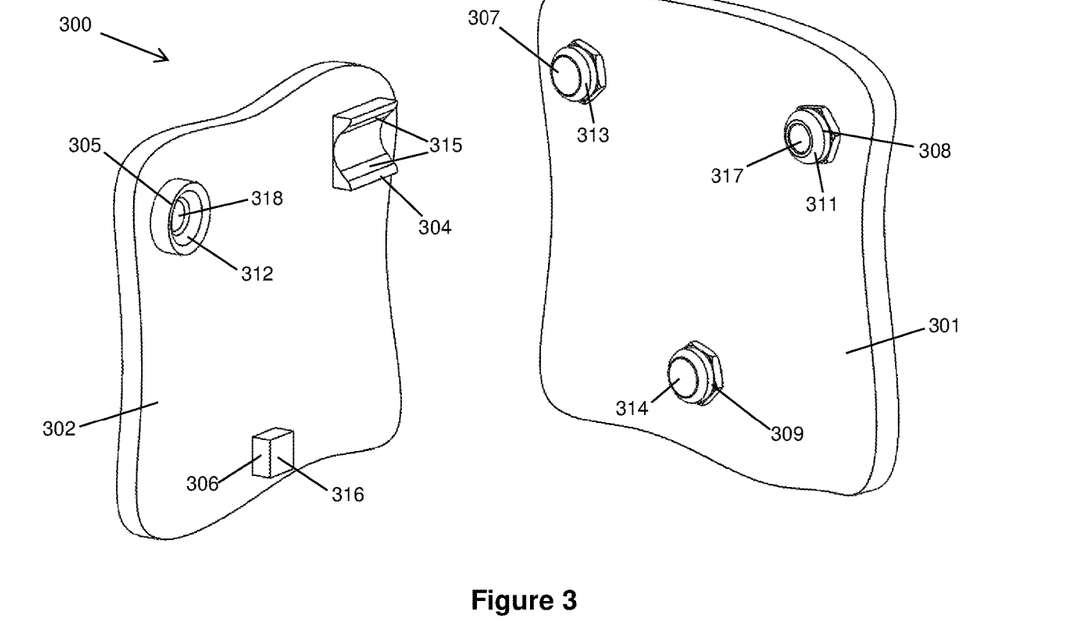
FIG. 3 depicts in perspective view an optical coupling according to an embodiment of the invention.

An embodiment of the invention will now be described with reference to FIG. 3, which depicts optical coupling 300. Optical coupling 300 includes first coupling portion 301 and second coupling portion 302, which are configured to mate in kinematic constraint via three mounting interfaces. The coupling portions have a substantially planar, solid configuration, which may suitably be integrated into complementary interfacing sides of modules in a modular optical spectrophotometer or other modular optical device.

First coupling portion 301 includes first mounting element 308 having spherical contact surface 311 in the form of a spherical segment. As used herein, a spherical contact surface has a substantially spherical contour at least at and immediately surrounding the expected contact point. Second coupling portion 302 includes socket 305 having conical socket contact surface 312. Socket 305 is configured to receive first mounting element 308, thereby forming the first mounting interface (a "socket mounting interface"), with contact surfaces 311 and 312 in contact. This constrains all three translations of coupling portions 301 and 302 relative to each other when mated, and thus all relative lateral displacements.

First coupling portion 301 also includes second and third mounting elements 307 and 309, having spherical contact surfaces 313 and 314 respectively. Contact surface 313 is in the form of a spherical segment, while contact surface 314 is hemispherical. Second coupling portion 302 includes vee 304, having two vee contact surfaces 315 and its vee groove oriented towards the socket, and flat 306 having flat contact surface 316. Vee 304 is configured to receive second mounting element 307, thereby forming the second mounting interface (a "vee mounting interface"), with contact surfaces 313 and 315 in contact. Flat 306 is configured for contact with mounting element 309, thereby forming the third mounting interface (a "flat mounting interface"), with contact surfaces 314 and 316 in contact. With all three the translations constrained by the first mounting interface, the second and third mounting interfaces together constrain all three rotational degrees of freedom of coupling portions 301 and 302. Thus, the first, second and third mounting interfaces cooperate to place the coupling bodies in full kinematic constraint when held together.

Optical coupling 300 includes an optical channel through which a beam of light may be transmitted when coupling portions 301 and 302 are mated. The optical channel is provided by circular aperture 317 in coupling portion 301 and circular aperture 318 in coupling portion 302. The apertures are complementary, in that they are aligned so as to allow passage of a beam of light along an optical axis when coupling portions 301 and 302 are mated. Moreover, the apertures have a sufficient diameter to allow the beam to be projected through the optical channel without clipping. For the case of an optical spectrophotometer, the apertures may have a diameter of less than 30 mm, such as less than 20 mm.

Aperture 317 passes through first mounting element 308, with its periphery surrounded by spherical contact surface 311. Aperture 318 passes through the bottom of socket 305, with its periphery surrounded by conical socket contact surface 312. Therefore, the optical channel, with an optical axis substantially normal to the lateral plane defined by the three mounting interfaces, passes through the first mounting interface when coupling portions 301 and 302 are mated. Advantageously, the placement of the optical axis through the first mounting interface minimises beam inaccuracies caused by mechanical tolerances in the interface components of interchangeable coupling portions, according to the principles disclosed herein. Moreover, the circular line of contact between spherical contact surface 311 and conical socket contact surface 312 provides a substantially light-impervious seal around the optical channel. This seal advantageously minimises the ingress of extraneous light into the optical channel.

It will be appreciated that the orientation of one or more of the first, second and third mounting interfaces may be reversed without departing from the scope of the invention. Thus, compared to the configuration depicted in FIG. 3, mounting element 307 may instead be located on coupling portion 302 and vee 304 located on coupling portion 301 and/or mounting element 309 may instead be located on coupling portion 302 and flat 306 located on coupling portion 301. Moreover, the mounting interfaces are not required to be located between planar surfaces of the coupling portions, or to define a plane which is aligned with such surfaces. For example, one or more of the mounting interfaces may be recessed into one of the coupling portions.

Optical coupling 300 may further comprise a clamping mechanism (not shown) configured to releasably hold first and second coupling portions 301 and 302 together with a pre-tensioning force when mated. The pre-tensioning force should be sufficient to securely hold the coupling portions together in kinematic constraint, such that the relative position of the coupling portions is not disturbed by external forces induced by expected impacts or vibrations in use. The clamping mechanism should generally be configured to release the two modules, such that they may be separated from each other and interchanged when required.

Figure 4:
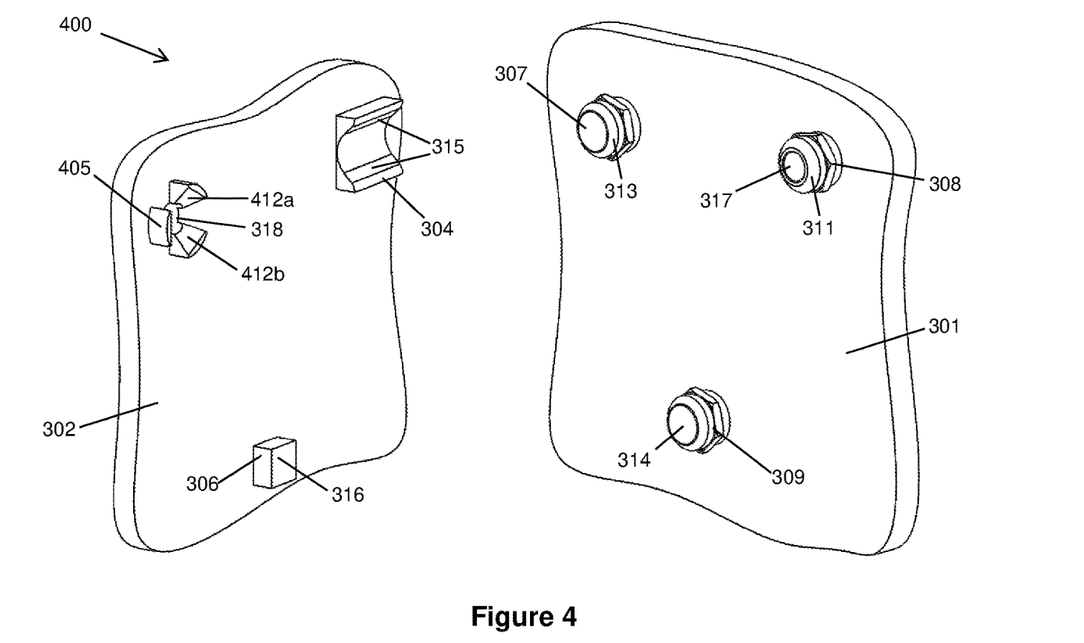
FIG. 4 depicts in perspective view an optical coupling according to another embodiment of the invention.

Another embodiment of the invention will now be described with reference to FIG. 4, which depicts optical coupling 400. Optical coupling 400 is identical to optical coupling 300, with like components similarly numbered, except that socket 405 is a trihedral socket having three planar contact surfaces 412 symmetrically arranged around the socket (contract surfaces 412a and 412b are numbered in FIG. 4). Socket 405 is thus configured to receive first mounting element 308, with spherical contact surface 311 abutting each of planar contact surfaces 412 at a single contact point. Advantageously, the trihedral design of socket 405 provides a highly reproducible kinematic mounting interface. However, compared to optical coupling 300, receipt of first mounting element 308 in socket 405 may not provide a light-impervious seal around the optical channel defined by apertures 317 and 318.

Figure 5:
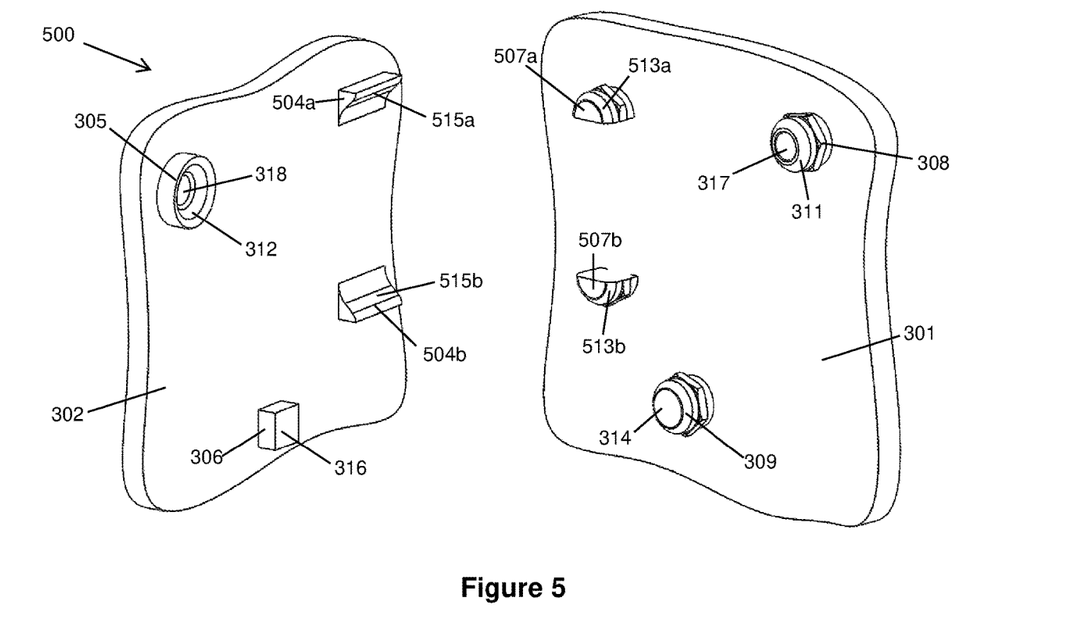
FIG. 5 depicts in perspective view an optical coupling according to another embodiment of the invention.

Another embodiment of the invention will now be described with reference to FIG. 5, which depicts optical coupling 500. Optical coupling 500 is similar to optical coupling 300, with like components similarly numbered. However, instead of a vee, second coupling portion 301 includes two half-vees 504a and 504b, having opposed angled contact surfaces 515a and 515b respectively. Moreover, coupling portion 301 includes second and fourth mounting elements 507a and 507b having spherical contact surfaces 513a and 513b respectively. Half-vees 504 are configured to receive their respective mounting element 507, with contact surfaces 513a and 515a and contact surfaces 513b and 515b in contact, thereby forming two different mounting interfaces ("half-vee mounting interfaces"). Thus, coupling portions 301 and 302 are mated in full kinematic constraint via four mounting interfaces.

Figure 6:
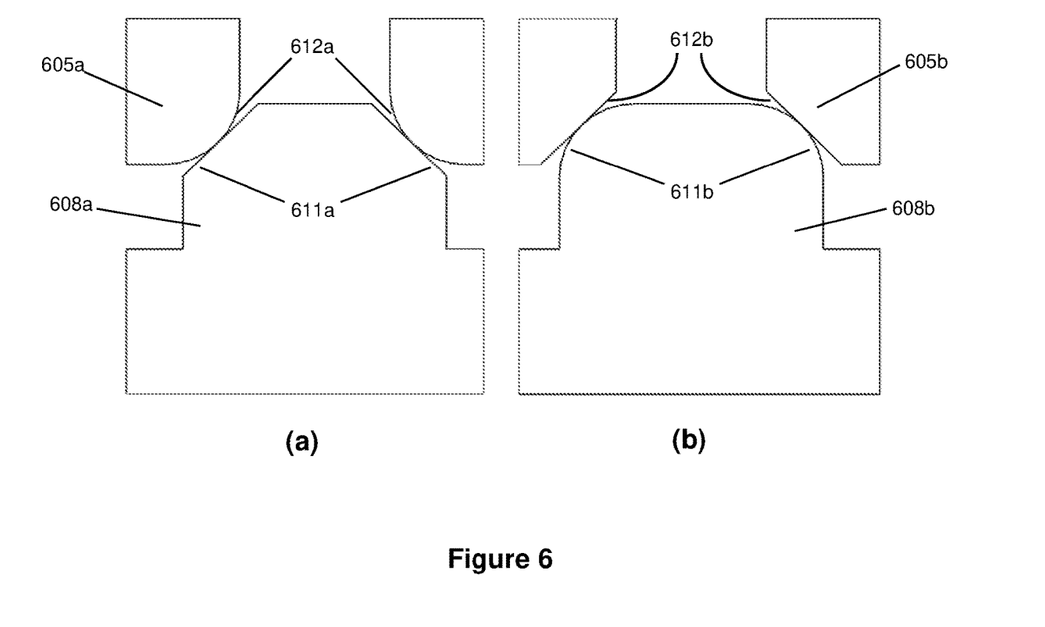
FIG. 6 schematically depicts in side cross-section view first mounting interfaces of optical couplings according to some embodiments of the invention.

In each of optical couplings 300, 400 and 500, the first mounting interface is defined by receipt of a mounting element in a socket, where the mounting element has a spherical contact surface. Another example of this arrangement is depicted in side cross-sectional view in FIG. 6b, showing mounting element 608b with spherical contact surface 611b received in conical socket 605b having angled planar contact surfaces 612b which are linear in the depicted cross-sectional view. Socket 605b may alternatively be trihedral, i.e. having three angled planar contact surfaces 612b arranged symmetrically around the socket to receive spherical contact surface 611b. It will be appreciated, however, that satisfactory kinematic contact may generally be provided when mounting element 608b has convex contact surfaces 611b, with perfectly spherical contact surfaces merely representing the ideal form of the suitable convex contact surfaces.

Moreover, it will be appreciated that the socket contact surfaces may instead be the convex contact surface required for kinematic constraint. An example of this arrangement is depicted in side view in FIG. 6a, showing mounting element 608a received in socket 605a. In this case, socket contact surfaces 612a are convex, and preferably spherical, in cross-section as depicted. Mounting element 608a has conical contact surfaces 611a which are linear in the depicted side cross-sectional view.

Another embodiment of the invention will now be described with reference to FIG. 7, which schematically depicts optical coupling 700. Optical coupling 700 includes first coupling portion 701 and second coupling portion 702, which as shown in the figure are mated in kinematic constraint via three mounting interfaces. First coupling portion 701 includes spherical-surface mounting elements 708, 707 and 709. Second coupling portion 702 (shown superimposed in dashed lines in the figure) includes conical socket 705, vee 704 and flat 706. Socket 705 receives mounting element 708 at the first mounting interface, while the second and third mounting interfaces are provided by receipt of spherical-surface mounting elements 707 in vee 704 and abutment of spherical-surface mounting element 709 against flat 706. The three mounting interfaces define an approximately equilateral triangle.

Optical coupling 700 includes optical channel 720 through which a beam of light may be transmitted. The optical channel is provided by non-circular aperture 717 in coupling portion 701 and non-circular aperture 718 in coupling portion 702. While not perfectly superimposed, the apertures are complementary in that they are sufficiently sized and aligned so as to allow passage of a beam of light along an optical axis through optical channel 720.

Differently from optical coupling 300, an optical axis of a light beam transmitted through optical channel 720 does not pass through the first mounting interface but is instead laterally removed therefrom. However, it is laterally removed from the first mounting interface by a distance that is less than half the lateral distance between the first mounting interface and the nearer of the second and third mounting interfaces (the flat interface as depicted in FIG. 7). While the relative positions of apertures 717 and 718 will thus be subject to some lateral displacements if either of coupling portions 701 or 702 is interchanged with another coupling portion, the proximity of optical channel 720 to the centre of rotation at the first mounting interface advantageously reduces the error compared with further removed locations, such as centroid 721 of the equilateral triangle defined by the three mounting interfaces.

Figure 7:
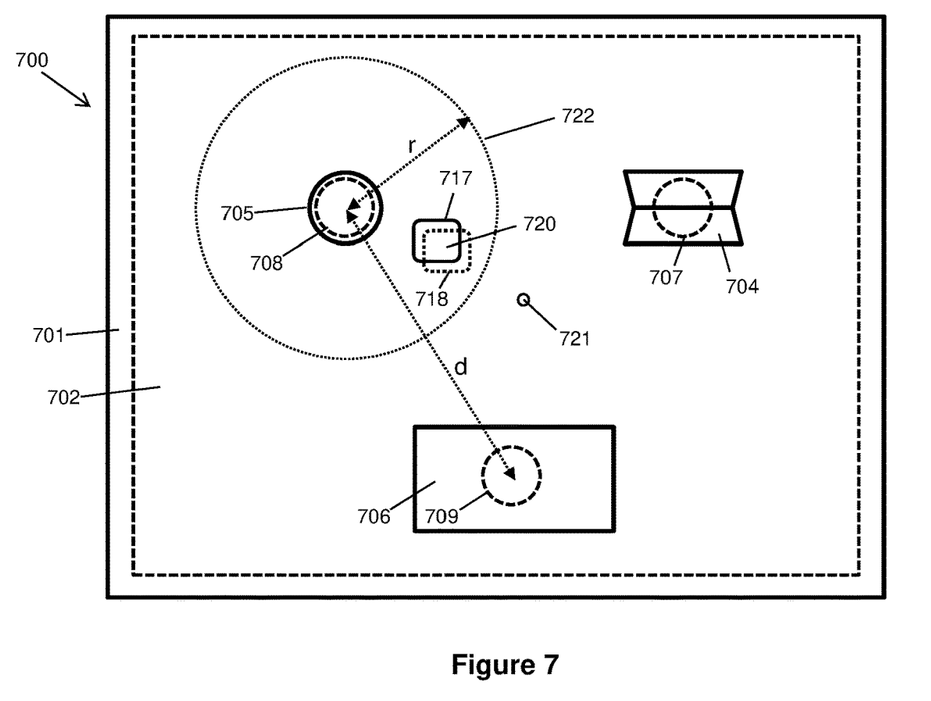
FIG. 7 depicts in plan view an optical coupling according to another embodiment of the invention.

With continued reference to FIG. 7, it will thus be appreciated that optical channel 702 may be located anywhere within circle 722, centred on the first mounting interface. Circle 722 is defined by a radius r, which as depicted is half of distance d between the first mounting interface and the nearest of the second and third mounting interfaces. According to the principles disclosed herein, the relative lateral displacements of coupling portions 701 and 702 at optical channel 702, caused by mechanical tolerances in the interface components when interchanging one of the coupling portions, is minimised as optical channel 702 approaches the first mounting interface. Thus, in some embodiments, r may be less than one third of d, or less than one quarter of d, or less than one eighth of d.

Optionally, the optical coupling may include multiple optical channels, each provided by corresponding apertures in coupling portions 701 and 702. At least one, and preferably each of the optical channels is located within circle 722. In this way, multiple beams, for example sample and reference beams in an optical spectrophotometer, may be transmitted to corresponding targets through the coupling portions, each beam being transmitted with high accuracy according to the principles disclosed herein.

Figure 8:
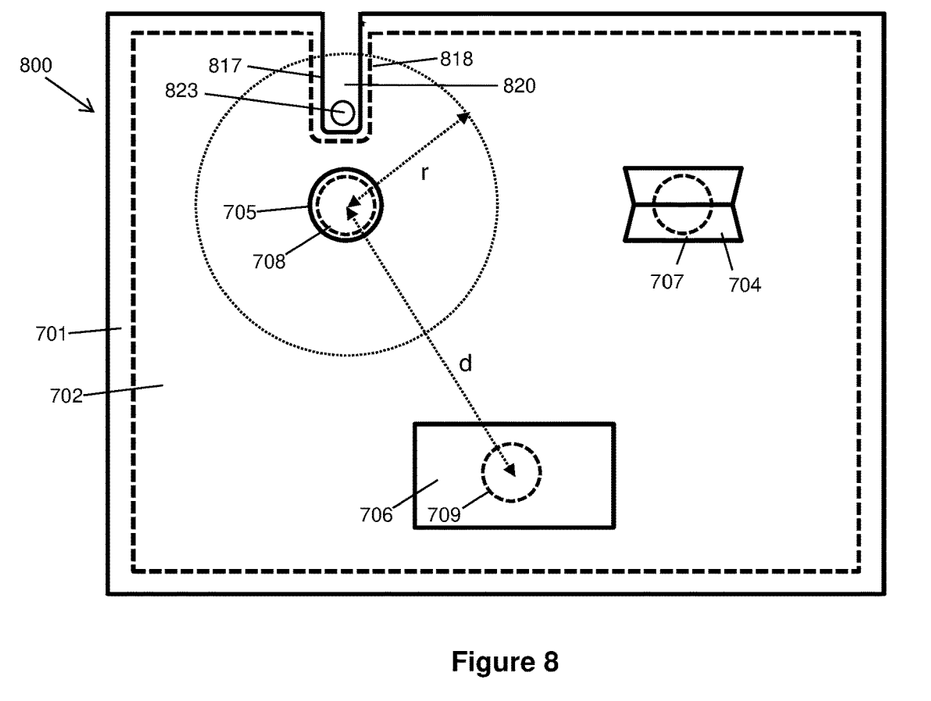
FIG. 8 depicts in plan view an optical coupling according to another embodiment of the invention.

Another embodiment of the invention will now be described with reference to FIG. 8, which schematically depicts optical coupling 800. Optical coupling 800 is similar to optical coupling 700, with like components similarly numbered. However, optical channel 820 is provided by opening 817 in coupling portion 701 and complementary opening 818 in coupling portion 702, both openings being in the form of slot openings extending inwards from the edges of the coupling portions. While the aligned area of opening through the coupling portions thus extends to the edge of both coupling portions, optical axis 823 of a beam transmitted through optical channel 820 remains close to the first mounting interface defined by socket 705 and spherical-surface mounting element 708. In particular, optical axis 823 is laterally removed from the first mounting interface by a distance that is less than half the lateral distance between the first mounting interface and the nearer of the second and third mounting interfaces.

In each of optical couplings 300, 400, 500, 700 and 800, the optical channel is provided by complementary openings in the coupling portions. It will be appreciated, however, that physical openings are not necessarily required. For example, an optical channel may suitably be provided by any complementary light-transmitting ports in the coupling portions, for example solid windows of a transparent material such as glass.

Figure 9:
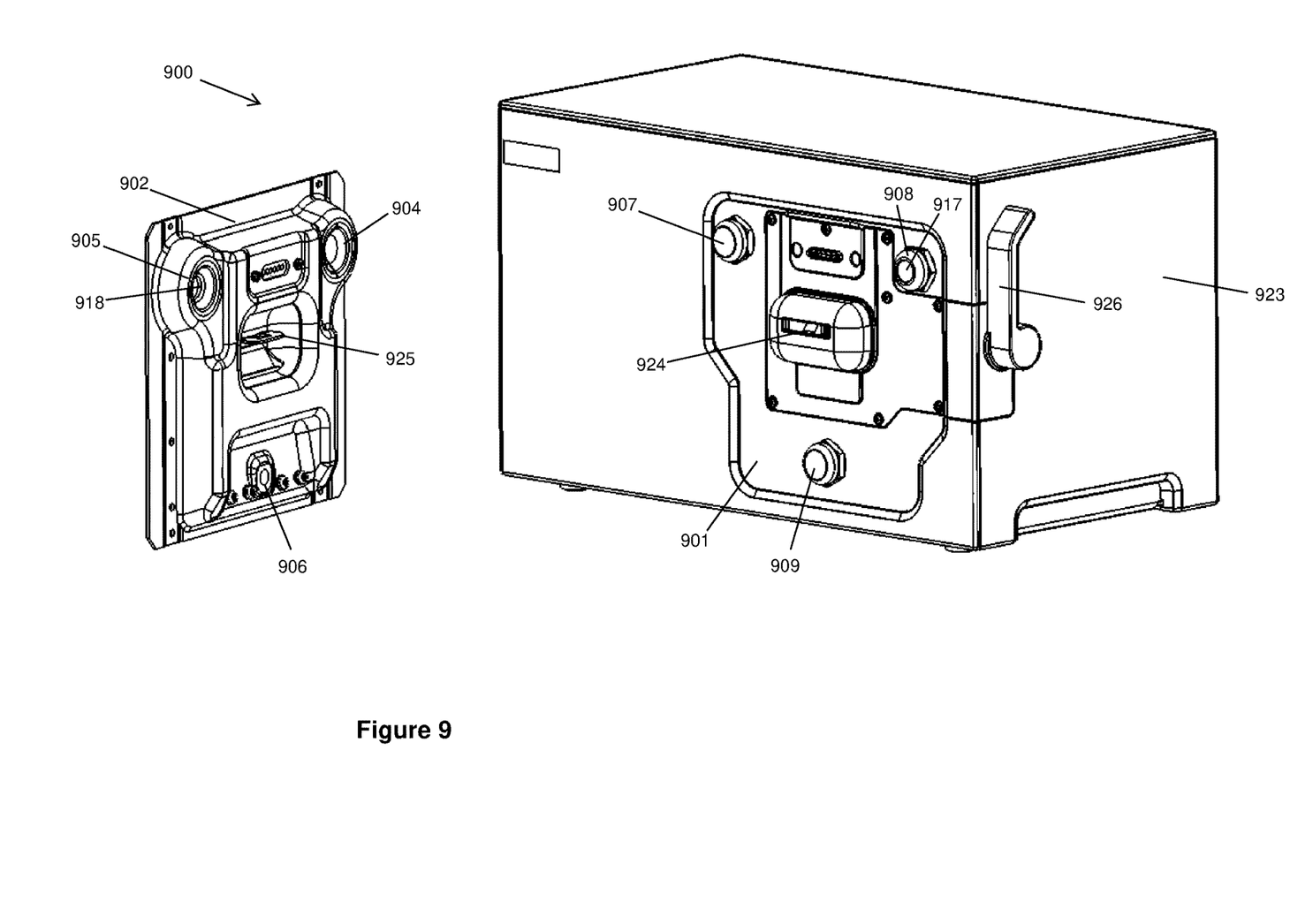
FIG. 9 depicts in perspective view an optical coupling according to another embodiment of the invention, with one of the coupling portions integrated into a module of a modular optical device.

Another embodiment of the invention will now be described with reference to FIG. 9, which depicts optical coupling 900. Optical coupling 900 includes first coupling portion 901 and second coupling portion 902, which are configured to mate in kinematic constraint via three mounting interfaces. Coupling portion 901 is integrated into one side of first module 923 of an optical spectrophotometer, whereas coupling portion 902 may be located on a second module (not shown) to be reversibly coupled to module 923.

First coupling portion 901 includes mounting elements 908, 907 and 909, while second coupling portion 902 includes conical socket 905, vee 904 and flat 906. Socket 905 receives mounting element 908 at the first mounting interface, while the second and third mounting interfaces are provided by receipt of mounting elements 907 in vee 904 and abutment of mounting element 909 against flat 906.

An optical channel is provided through optical coupling 900 by circular aperture 917, which passes through first mounting element 908 in coupling portion 901, and circular aperture 918, which passes through socket 905 in coupling portion 902. When coupling portions 901 and 902 are mated, a beam of light from a beam source in module 923 may be transmitted through the optical channel to a beam target in the second module (or, alternatively, the other way around). As described herein for optical coupling 300, this arrangement advantageously minimises beam inaccuracies caused by mechanical tolerances in the interface components on interchangeable modules, and provides a substantially light-impervious seal around the optical channel.

Optical coupling 900 includes a clamping mechanism, including latch 924 on coupling portion 901 configured to receive hook 925 of coupling portion 902. In use, coupling portions 901 and 902 can be mated in kinematic constraint and held together with a pre-tensioning force using locking handle 926. Clockwise rotation of locking handle 926, from its disengaged position seen in FIG. 9, fastens hook 925 in latch 924 and loads a leaf spring (not shown) coupled to hook 925 (not shown). The loaded leaf spring biases the coupling portions towards each other with a spring force. Coupling portions 901 and 902 may be uncoupled when required by rotating locking handle 926 anticlockwise back to the disengaged position.

The present invention also relates to a modular optical device, which typically includes an optical coupling as described herein. The modular optical device includes a first module comprising a beam source and a second module comprising a beam target. The first module may suitably include either the first or second coupling portions of the optical coupling, with the other coupling portion present on the second module. The first module may thus be releasably coupled to the second module via the optical coupling, such that a beam of light may be transmitted along an optical axis from the beam source to the beam target.

As disclosed herein, it is preferred that the optical axis is not laterally removed from the first mounting interface by more than half the distance between the first mounting interface and the nearest of the further mounting interfaces. Most preferably, the optical axis passes through the first mounting interface. Moreover, the optical axis is preferably substantially aligned with the expected axis of rotation between the coupling portions, through the first mounting interface, caused by tolerances in the lateral positions of the mounting interface components according to the principles disclosed herein. Accordingly, in some embodiments the optical axis is aligned with, or indeed coaxial with, the axis extending through the centres of the first mounting element and the socket when mated.

In some embodiments, the modular optical device is an optical spectrophotometer, and the following discussion will generally be directed to such devices. However, the modular optical device may in principle be any of a wide range of modular optical devices having a beam source and a beam target in separate modules which are coupled by an optical coupling as described.

The beam source in the first module may include a light source, such as a lamp. An example of a suitable lamp for a UV-Vis optical spectrophotometer is a short-arc flash lamp comprising electrodes contained in pressurised xenon gas. The beam source may also include one or more monochromators of conventional design, configured to produce light with a narrow wavelength range (i.e. substantially monochromatic). Typically, the monochromator system is configured to vary the wavelength of the monochromatic light beam across a desired scanning range. In some embodiments, the beam of light thus transmitted by the beam source may have a beam patch with dimensions in the range of 2 mm to 7 mm at the intended beam target in the second module, but it will be appreciated that smaller or larger beam patches will be suitable for other applications.

It will be appreciated that the first module may comprise other conventional components, including optical elements such as mirrors, lenses, dispersive elements such as diffraction gratings and prisms, and fibre optic/waveguide elements, and mechanical, electronic and computational components associated with the beam source. In some embodiments, the first module comprises two or more beam sources, or a beam splitter configured to split a primary beam into two or more split beams. Thus, multiple beams (for example a sample beam and a reference beam) may be transmitted onto corresponding beam targets in the second module. In such embodiments, at least one and optionally each of these beams is transmitted through an optical channel in the optical coupling according to the invention. Preferably, the optical axis of each beam passing through the optical coupling is proximate to, or indeed passes through, the first mounting interface according to the principles disclosed herein. Thus, the benefits of high beam accuracy may be provided for each of the beams.

The beam target in the second module may be a detector of conventional design, configured to detect the intensity of the light beam transmitted from the beam source in the first module, typically as the wavelength of monochromatic light is scanned across a desired range. A sample compartment, such as a cuvette holder configured to receive a sample cuvette, may be provided in the second module such that the beam passes through the sample when transmitted to the detector during an analysis. In other embodiments, the initial beam target in the second module may be a beam splitter, for example as disclosed in the applicant's PCT patent application PCT/162018/050245, or an optical waveguide, for example as disclosed in the applicant's Australian provisional patent application 2018901362, both of which are hereby incorporated by reference. In other embodiments, the initial beam target is an optical element such as a mirror or lens, for example configured to redirect the beam towards an ultimate beam target such as a detector. Thus, for example, it is contemplated that the detector may be located in first module together with the beam source. The second module then contains the sample for analysis and associated optics to direct the beam from the beam source through the sample and back into the first module for detection.

It will be appreciated that the second module may comprise other conventional components, including optical elements such as mirrors, lenses, dispersion elements such as diffraction gratings or prisms, and fibre optic/waveguide elements, and mechanical, electronic and computational components associated with the beam target(s) and sample management.

As described herein, a particular advantage of the invention is that a high degree of beam accuracy may be maintained when either of the first or second modules is interchanged with a suitably compatible further module, despite tolerances in the interface components. Accordingly, the modular optical device may include one or more third modules, each of which comprises a beam source. The third modules are configured to be interchangeable with the first modules, and thus include the corresponding coupling portion and light-transmitting port of the optical coupling. The first and third modules may be substantially identical, which may be useful to minimise downtime when the first module must be removed for repair or maintenance. Alternatively, the first and third modules may be non-identical. For example, they may include different beam sources, each beam source being preferred for a different analysis. Optionally, the first and third modules may be constructed or aligned on different jigs, yet still provide the desired beam accuracy.

The modular optical device may also, or alternatively, include one or more fourth modules, each of which comprises a beam target. The fourth modules are configured to be interchangeable with the second modules, and thus include the corresponding coupling portion and light-transmitting port of the optical coupling. The second and fourth modules may be substantially identical or non-identical. For example, they may include different sample systems and or detection systems to allow for a variety of different analyses. Optionally, the second and fourth modules may be constructed or aligned on different jigs, yet still provide the desired beam accuracy.

For the case of a modular optical spectrophotometer, the inventors have found that the beam is transmittable to the beam target with an accuracy of better than 50 microns when the first and third modules, or the second and fourth modules, are interchanged. Such accuracy has previously been challenging to achieve for modular optical spectrophotometers.

Figure 10:
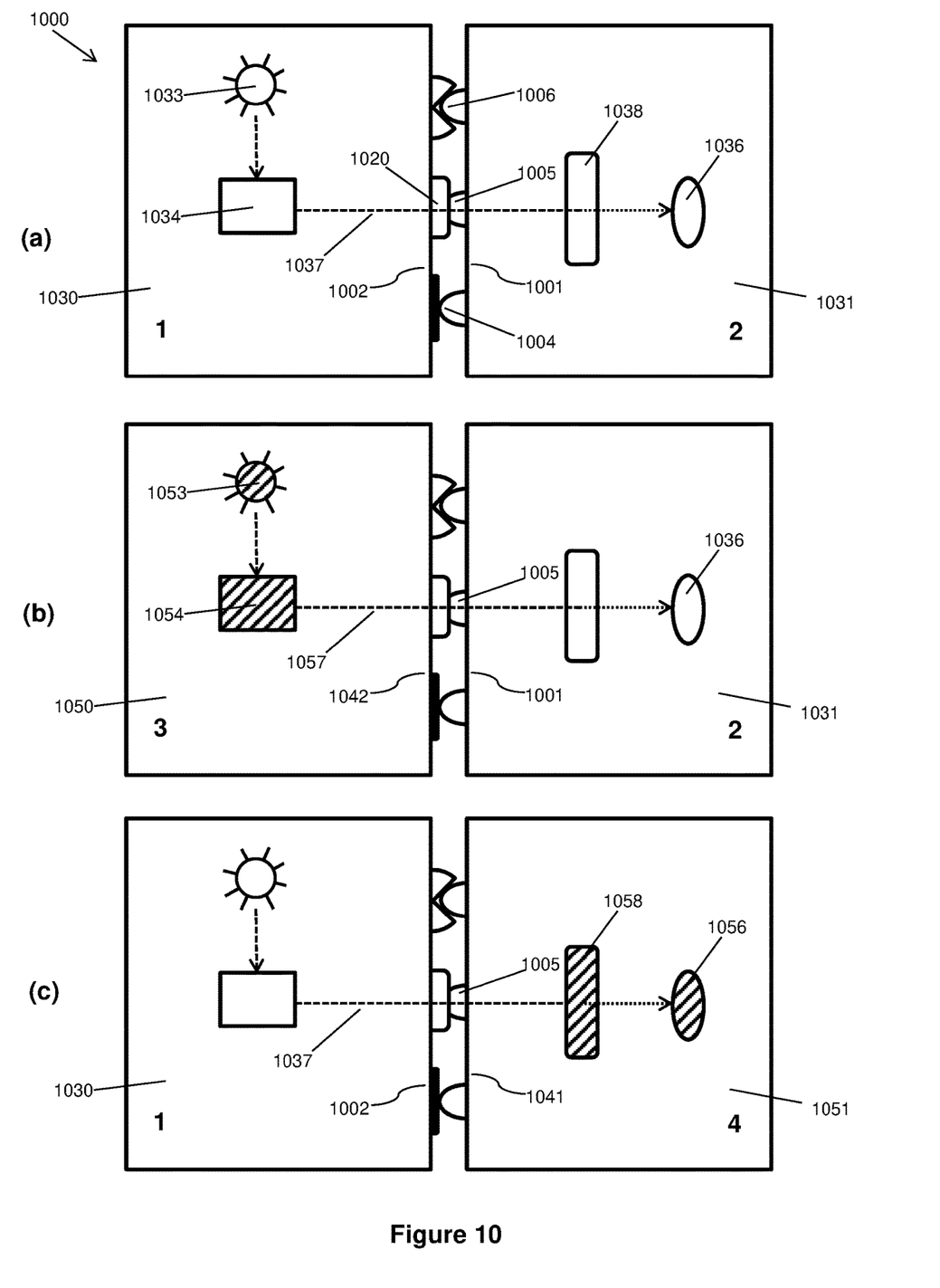
FIG. 10 schematically depicts in side section view a modular optical device according to an embodiment of the invention, in which first and second modules are coupled with an optical coupling, the first module is interchangeable with a third module and the second module is interchangeable with a fourth module.

An embodiment of the invention will now be described with reference to FIG. 10, which schematically depicts modular optical device 1000 in side section view. As seen in FIG. 10a, optical device 1000 includes first module 1030 and second module 1031. First module 1030 includes a beam source comprising lamp 1033 and monochromator 1034, while second module 1031 includes a beam target in the form of detector 1036. The modules are coupled by an optical coupling which includes first coupling portion 1001 on module 1031 and second coupling portion 1002 on module 1030, held in kinematic constraint via first mounting interface 1005 and further mounting interfaces 1004 and 1006. First mounting interface 1005 is a socket mounting interface as disclosed herein, while further mounting interfaces 1004 and 1006 may be flat and vee interfaces as disclosed herein. Optical channel 1020 passes through first mounting interface 1005, such that beam 1037 may be transmitted from the beam source, through sample holder 1038, to beam target 1036 according to the principles disclosed herein.

As depicted in FIG. 10b, modules 1030 and 1031 have been decoupled, and third module 1050 has instead been coupled to second module 1031. Third module 1050 may be identical or non-identical to first module 1030. In the latter case, the beam source comprising lamp 1053 and monochromator 1054 may be different to the beam source of module 1030. Third module 1050 includes second coupling portion 1042 which is manufactured to be substantially identical to second coupling portion 1002, subject to the inevitable mechanical tolerances in their interface components. Beam 1057 from the beam source in third module 1050 may thus also be transmitted through sample holder 1038 to beam target 1036. As a result of the positioning of the optical axes of beams 1037 and 1057, i.e. through first mounting interface 1005, beams 1037 and 1057 may be projected accurately onto beam target 1036 when the first and third modules are interchanged, despite the mechanical tolerances in their interface components.

As depicted in FIG. 10c, modules 1030 and 1031 have been decoupled, and fourth module 1051 has instead been coupled to first module 1030. Fourth module 1051 may be identical or non-identical to second module 1031. In the latter case, beam target 1056 and/or sample holder 1058 may be different to the corresponding components of module 1031. Fourth module 1051 includes first coupling portion 1041 which is manufactured to be substantially identical to first coupling portion 1001, subject to the inevitable mechanical tolerances in the interface components. Beam 1037 from the beam source in first module 1030 may thus also be transmitted through sample holder 1058 to beam target 1056. As a result of the positioning of the optical axes of beam 1037, i.e. through first mounting interface 1005, the beam may be projected accurately onto beam targets 1036 and 1056 when the second and fourth modules are interchanged, despite the mechanical tolerances in their interface components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. An optical coupling, comprising:
a first coupling portion and a second coupling portion, the first and second coupling portions configured to mate in kinematic constraint via a first mounting interface and at least two further mounting interfaces, wherein:
the first coupling portion comprises a first mounting element and the second coupling portion comprises a socket, and
the first mounting element is receivable in the socket at the first mounting interface such that the first mounting interface constrains lateral displacements of the first coupling portion relative to the second coupling portion when mated; and
at least one optical channel for transmitting a beam of light along an optical axis through the optical coupling, the optical channel comprising complementary light-transmitting ports in the first and second coupling portions,
wherein the optical axis is not laterally removed from the first mounting interface by more than half the distance between the first mounting interface and the nearest of the further mounting interfaces.

2. An optical coupling according to claim 1, wherein the optical axis is not laterally removed from the first mounting interface by more than one third of the distance between the first mounting interface and the nearest of the further mounting interfaces.

3. An optical coupling according to claim 1, wherein the optical axis passes through the first mounting interface.

4. An optical coupling according to claim 3, wherein the complementary light-transmitting ports are apertures within the first mounting element and the socket.

5. An optical coupling according to claim 3, wherein a substantially light-impervious seal is provided around the optical channel when the first mounting element is received in the socket.

6. An optical coupling according to claim 1, wherein the first mounting element comprises one or more convex mounting contact surfaces for contact with one or more socket contact surfaces when the first mounting element is received in the socket.

7. An optical coupling according to claim 6, wherein the convex mounting contact surfaces have the form of a spherical segment.

8. An optical coupling according to claim 1, wherein the socket is a conical socket.

9. An optical coupling according to claim 1, wherein at least one of the complementary light-transmitting ports is an aperture having a maximum width of less than 30 mm.

10. An optical coupling according to claim 1, where the further mounting interfaces consist of one vee mounting interface and one flat mounting interface.

11. An optical coupling according to claim 1, further comprising a clamping mechanism configured to releasably hold the first and second coupling portions together when mated.

12. A modular optical device comprising an optical coupling according to claim 1.

13. A modular optical device according to claim 12, comprising a first module comprising a beam source and a second module comprising a beam target, wherein the first module releasably couples to the second module via the optical coupling such that a beam of light is transmittable through the optical channel from the beam source to the beam target.

14. A modular optical device according to claim 13, further comprising one or more third modules and/or one or more fourth modules, wherein:
the third modules comprise a beam source, and the first and third modules interchangeably couple to the second module, and
the fourth module comprises a beam target, and the second and fourth modules interchangeably couple to the first module.

15. A modular optical device according to claim 14, wherein the beam is transmittable onto the beam target with an accuracy of better than 50 microns when the first and third modules are interchanged and/or when the second and fourth modules are interchanged.

16. A modular optical device according to claim 12, wherein the modular optical device is an optical spectrophotometer.

17. A modular optical device comprising at least first and second modules, wherein:
one of the first and second modules comprises a first coupling portion and the other of the first and second coupling portions comprises a second coupling portion, the first and second coupling portions configured to mate in kinematic constraint via a first mounting interface and at least two further mounting interfaces, wherein:
the first coupling portion comprises a first mounting element and the second coupling portion comprises a socket, and
the first mounting element is receivable in the socket at the first mounting interface such that the first mounting interface constrains lateral displacements of the first coupling portion relative to the second coupling portion when mated; and
the first module comprises a beam source and the second module comprises a beam target, configured such that the beam source transmits a beam of light along an optical axis onto the beam target when the first and second coupling portions are mated,
wherein the optical axis is not laterally removed from the first mounting interface by more than half the distance between the first mounting interface and the nearest of the further mounting interfaces.

18. A modular optical device according to claim 17, wherein the optical axis is not laterally removed from the first mounting interface by more than one third of the distance between the first mounting interface and the nearest of the further mounting interfaces.

19. A modular optical device according to claim 17, wherein the optical axis passes through the first mounting interface.

20. A modular optical device according to claim 19, wherein the beam is transmitted through complementary apertures within the first mounting element and the socket, wherein a substantially light-impervious seal is provided when the first mounting element is received in the socket.

* * * * *